Sept. 9, 1969  J. P. CHERNOCH  3,466,569

LASER DEVICE

Filed Oct. 1, 1965  2 Sheets-Sheet 1

Inventor:
Joseph P. Chernoch,
by Paul A. Frank
His Attorney.

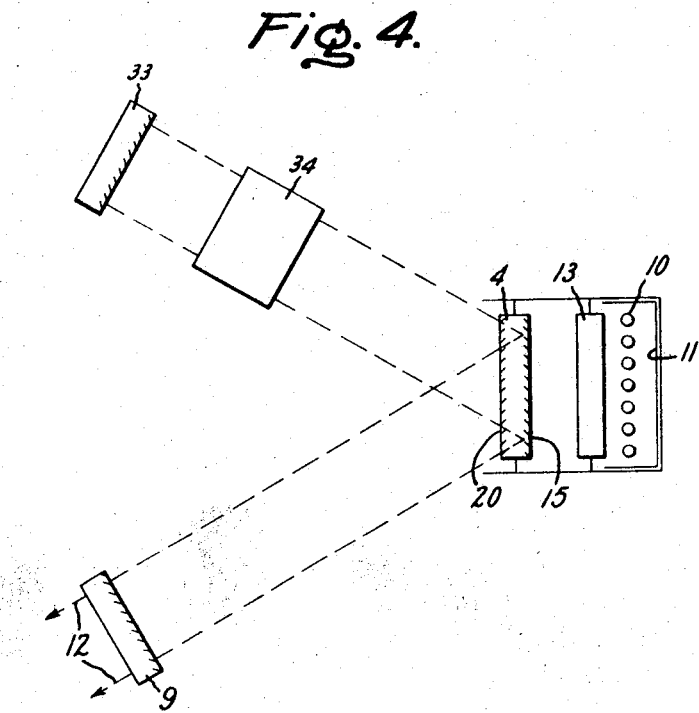

United States Patent Office 3,466,569
Patented Sept. 9, 1969

3,466,569
LASER DEVICE
Joseph P. Chernoch, Scotia, N.Y., assignor to General
Electric Company, a corporation of New York
Filed Oct. 1, 1965, Ser. No. 491,921
Int. Cl. H01s 3/09
U.S. Cl. 331—94.5                                1 Claim

ABSTRACT OF THE DISCLOSURE

A disk-shaped body of laser material has a first of two opposed end surfaces coated to provide 100% reflection at the laser energy wavelength. The laser disk is optically pumped through the first end surface and a laser beam is emitted through the second end surface. The laser disk may be used in an oscillator or amplifier laser device. In the amplifier configuration, the disk may be utilized in a two-pass configuration wherein an unamplified laser beam is incident on the second surface at an angle relative to the disk normal and is emitted therefrom in amplified form at the conjugate angle.

My invention relates to a laser apparatus for generating a beam of electromagnetic energy, and in particular, to a disk-shaped body of laser material having one end surface thereof emitting the laser beam, and the laser material being optically pumped through the second end surface.

A recently developed device, now conventionally described as a laser (light amplification by stimulated emission of radiation), has the potential for wide application in many diverse fields such as communication, metallurgy and medicine. The laser is a light source having the radiated output therefrom predominantly in one or more narrow bands of the electromagnetic spectrum. Such output is a narrowly diverging beam of light which is usually in the visible or infrared frequency range of the electromagnetic spectrum. Specific liquids, gases and solid media have been found to exhibit the properties of the laser wherein the laser media releases electromagnetic energy which can be stored in discrete metastable states as a result of being excited or pumped by an electrical or electromagnetic signal of frequency compatible with the particular laser medium. The pumping means excites the laser media into a metastable high energy state whereupon a stimulated emission of monchromatic and directional (coherent) electromagnetic radiation is emitted from the laser media. The stimulated emission is initiated in the laser material by an initial spontaneous emission of electromagnetic radiation which is amplified by multiple reflection within a suitable optical resonant cavity to thereby generate the stimulated emission. The optical resonant cavity may comprise an external cavity formed by external reflectors, or in the case of solid laser material may comprise external reflectors or suitable reflective coatings on the end surfaces of the laser body to define what may be described as an internal optical resonant cavity. The reflective surfaces, whether of the internal or external optical resonant cavity type, are spaced apart an integral number of half-wavelengths at the optical radiation frequency characteristic of a selected energy level transition of the particular laser medium which generates the stimulated emission of electromagnetic radiation (hereinafter described as the laser beam). This spacing is the optical length which includes the effect of the refractive indices of all materials contained within the optical resonant cavity.

The laser beam is initially generated within a laser oscillator device, such device including an optical resonant cavity wherein one of the cavity defining surfaces is highly reflective (essentially 100% reflective) and the other surface only partially reflective (and partially transmissive) such that upon the density of excited atoms within the laser medium exceeding the critical value at which stimulated emission exceeds fluorescent radiation and other losses, a laser beam is emitted from the cavity, passing through the partially transmissive surface. Many applications require energy outputs which are higher than that obtained from the laser oscillator alone and for such cases a laser amplifier is optically coupled to the output of the oscillator. The laser amplifier is similar in construction to the laser oscillator in that a body of laser material and pumping means for exciting the laser material are used. Laser amplifiers, in general, are of the single-pass type wherein an incident unamplified laser beam passes only once through the laser material and is amplified thereby.

The solid laser material provides the highest energy output as compared to the liquid and gas lasers and conventionally has been employed in rod form wherein a relatively long cylindrical body of laser material has a pair of opposed relatively small end surfaces. The laser rod is optically pumped through the sides thereof. More recently, the solid laser material in a disk-shaped form has been developed to provide the highest energy output due to the more efficient optical pumping produced by pumping through the relatively large end surfaces thereof. The laser disk devices are described in copending U.S. patent applications Ser. No. 315,054, entitled "Directly Pumped Laser," inventor Joseph P. Chernoch, filed Oct. 9, 1963 and Ser. No. 467,941, entitled "Laser Device," inventors Kiyo Tomiyasu and Joseph C. Almasi, filed June 29, 1965, both assigned to the assignee of the present invention. Each of these copending patent applications disclose disk-shaped bodies of solid laser material which may be optically pumped through one end surface thereof but are preferably pumped through both end surfaces and the laser beam passes through both such end surfaces.

Therefore, one of the principal objects of my invention is to provide a disk-shaped laser device wherein only a first end surface thereof, which is totally reflective, is optically pumped and a laser beam is emitted through the second end surface.

Another object of my invention is to provide a laser disk oscillator wherein the first end surface functions as one end of an optical resonant cavity.

A further object of my invention is to provide a laser disk amplifier of the two-pass type wherein an unamplified laser beam is incident upon the second end surface and emitted therefrom in amplified form.

Briefly stated, I provide a laser device wherein the laser material is in disk-shaped form and a first of the two opposed end surfaces thereof is coated to provide substantially 100% reflectivity at the laser energy wavelength for the particular laser material. The laser disk is optically pumped through the first end surface and a laser beam is emitted through the second end surface. The disk thus acts as an "active mirror." The second (emitting) end surface of the disk may be uncoated, antireflection coated, or coated to provide a reflectivity of somewhat less than 100% at the laser energy wavelength, and in any of these three cases the disk may be employed in a laser oscillator configuration. When used in a laser oscillator apparatus, the first (pumped) end surface of the disk may define one end of an optical resonant cavity. The single end surface pumped, single end surface laser beam emitting disk may also be utilized in a two-pass laser amplifier configuration wherein an unamplified laser beam is incident upon the second end surface at an angle relative to the disk normal and is emitted therefrom in amplified form at the conjugate angle. The laser amplifier may include a plurality of serially optically coupled active mirrors or modules whereby the laser beam emitted therefrom has an extremely high energy, especially in pulse mode operation of the laser bodies.

The features of my invention which I desire to protect herein are pointed out with particularly in the appended claims. The invention itself, however, both as to its organization and method of operation, together with further objects and advantages thereof, may best be understood by reference to the following description taken in connection with the accompanying drawings wherein:

FIGURE 4 is a diagrammatic view of a third embodiment of the oscillator.

Figure 1:
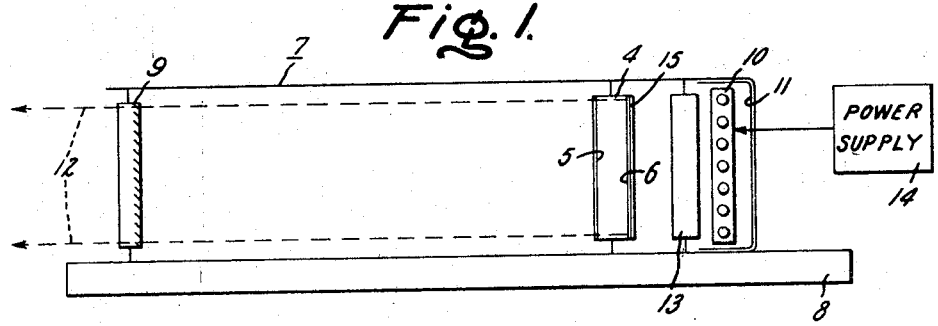
FIGURE 1 is a diagrammatic side view of a laser oscillator constructed in accordance with my invention wherein the laser beam emitting end surface of the disk is antireflection coated.

The output energy of the emitted laser radiation from a body of laser material is determined primarily by the geometry and size of the laser material, type of laser material, and the amount of optical pumping energy absorbed by such material. The directionality of the emitted laser radiation is determined primarily by the geometry of the laser material in an optical resonant cavity. Since the output energy of the radiation emitted by a laser rod is determined by the energy density and cross sectional area of the rod, higher outputs of laser energy are obtained by increasing the rod length and pumping energy therealong, and also the rod cross sectional area. However, a limit is reached beyond which an increase in the size of the present rod-type laser does not generate a proportional increase in laser output energy. The limit is determined by several factors including the facts that (1) the activated portion of laser material is determined by the depth to which the pumping energy can penetrate thereby limiting the maximum cross sectional area of the laser rod, (2) increasing the length of the laser rod beyond a certain dimension presents the practical problem of producing long pieces of optically perfect laser material, (3) destruction of laser material occurs when laser energy density reaches a sufficiently high level, (4) a spontaneous avalanche condition occurs when the gain-length factor of the laser rod exceeds a certain value thereby precluding a high degree of directivity in the beam of laser radiation, and (5) nonuniform temperature within the laser medium during optical pumping, as a function of laser rod radius, causes optical path distortion. The hereinabove mentioned laser disk overcomes these five disadvantages of the laser rod and thus is especially well suited for high energy applications.

As illustrated in FIGURES 1, 2, 3 and 4, the body of laser material employed in my invention consists of a relatively short cylindrical body 4 of laser material having a pair of opposed, relatively large, planar end surfaces 5 and 6. These end surfaces are, in general, parallel to each other, but this is not a necessary requirement except in the FIGURES 2, 4 embodiment wherein both end surfaces are reflection coated. I define a "relatively short" body having "relatively large" end surfaces as one in which a diameter dimension exceeds the longitudinal dimension. As herein employed "cylindrical" is defined as the surface traced by any straight line moving parallel to a fixed straight line. Thus, the cross-section of the laser disk body may be circular, elliptical, square or any other suitable shape as desired. The geometry is preferably such that the diameter of the laser body is considerably greater than the length thereof and thus forms a disk-like member. End surface 6 of laser disk 4 is coated to provide substantially 100% reflectivity at a laser energy radiation wavelength characteristic of the particular laser material and is highly transmissive at optical pumping radiation wavelengths, which excite the particular laser material into a metastable high energy level. This coating 15 may be of the well-known multi-layer dielectric mirror type. Any laser beam generated (in the oscillator embodiments of FIGURES 1, 2, 4) or amplified (FIGURE 3) is thus reflected by end surface 6 and emitted thru end surface 5. The side edges (non-end surfaces) of the laser disk are preferably coated to provide a highly absorbing surface at the laser energy wavelength and thereby prevent internal reflections from such side edges. In my present invention the laser material is optically pumped through the laser beam reflective surface 6, and thus my particular configuration of the disk laser may be described as an "active mirror" as distinguished from the laser disks described in the aforementioned patent applications. In the oscillator embodiments of FIGURES 1, 2, end surface 6 comprises one end of an optical resonant cavity. The other end of the optical resonant cavity is defined by an external reflector 9 which may be a partially transmissive plane mirror in alignment with laser disk 4. The optical length between external reflector 9 and totally reflective surface 6 is equal to an integral number of half-wavelengths at an optical radiation frequency characteristic of a particular energy level transition in the laser medium (i.e., the laser electromagnetic radiation frequency).

The means for optically pumping the laser material to an upper energy level comprises at least one lamp, and in general, a bank or plurality of electric lamps 10 in a planar arrangement parallel to end surface 6, and in direct optical communication therewith. The lamps 10 have a radiation output preferably in a narrow and desired spectral range and may be of the flash type for pulsed laser operation and of the constant light output type for a continuously operating laser. A suitable source of electrical energy 14 (shown only in FIGURE 1 for simplification) is connected to the terminal ends of the optical pumping lamps 10. In the case of flash lamps, a conventional high voltage electronic trigger circuit may be employed to initiate the gaseous discharge within such flash lamps.

Figure 2:
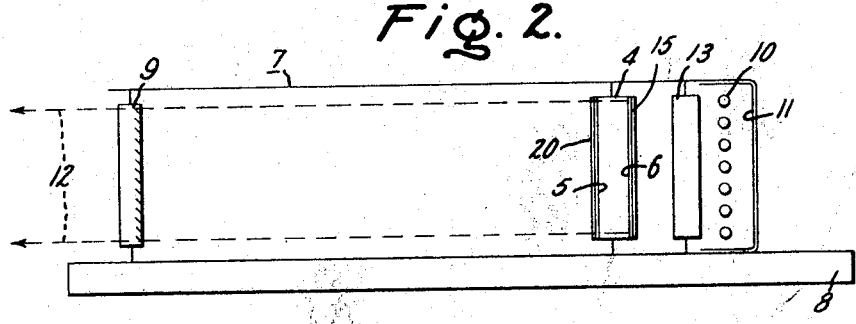
FIGURE 2 is a diagrammatic side view of a second embodiment of the oscillator wherein laser action may be controlled by providing a coating of somewhat less than 100% reflectivity on the disk laser beam emitting surface.

Referring particularly to the laser oscillator embodiments illustrated in FIGURES 1 and 2, laser disk 4, external reflector 9 and optical pumping means 10 are supported within housing 7 with the necessary rigidity to maintain alignment of external reflector 9 with disk 4. Housing 7 may be made of metal and is rigidly supported on a base member 8. A first end portion of housing 7 is provided with a highly reflective surface 11 such as polished aluminum to increase the efficiency of the laser pumping. The lamp bank 10 is mounted in close proximity to the disk to further increase the efficiency of the pumping. In the case wherein laser disk 4 is circular in cross section, housing 7 may also be circular in cross section, if desired, the particular housing shape not being critical. The second end portion of housing 7, adjacent external reflector 9 is, in general, open-ended to permit unobstructed emission of the laser beam shown defined by dashed lines 12. A suitable selective radiation filter 13 is preferably, though not necessarily, interposed between laser disk 4 and the pumping means 10 to filter out the spectrum of the lamp radiation which is not useful for pumping the laser disk and thereby reduce the heating thereof. Alternatively, or in addition, cooling means such as forced air or liquid coolants may be employed, the cooling means being most effective when applied to the lamps and as one example, may comprise a suitable water jacket wherein the inner wall thereof comprises the outer fused silica of a pumping lamp and the outer wall is fabricated from a material which filters out the ineffective radiation to obtain a combined selective pump radiation filter and cooling effect. Controlled atmospheres may also be provided within housing 7 to minimize absorption by such atmosphere of the intense pump and laser output radiation. Such atmosphere may be provided solely in the disk portion or the lamp portion of the housing or may completely fill the housing.

In the FIGURE 1 embodiment of the laser disk oscillator, surface 5 of the disk is antireflection coated to reduce the inherent interface reflection loss at the air-dielectric interface of such (uncoated) end surface. The optical resonant cavity is defined by external reflector 9 and reflective surface 6.

The second embodiment of the laser disk oscillator, illustrated in FIGURE 2, has the laser disk emitting end surface 5 coated with a multilayer dielectric material 20 having a reflectivity somewhat less than 100% at the laser radiation wavelength (in the range of 70 to 98%) thus being partially transmissive. The two end surfaces of this laser disk thus define a relatively low Q optical resonant cavity, and the effect of this laser disk cavity is to lower the Q of the outer cavity formed by external reflector 9 and totally reflective surface 6. As a result, a greater number of the laser energy reflections, in general, occur within the laser disk cavity than in the outer cavity, thereby decreasing the laser energy density in the outer cavity. The lower laser energy density in the outer cavity permits control of the mode (frequency and beam divergence) of laser action by insertion of optical mode selecting components, such as a limiting aperture, and also permits modulation of the laser beam by employing any known optical modulation elements, within the cavity. It is to be understood that the external reflector 9 in FIGURE 1, in general, has a higher reflectivity than the corresponding element in FIGURE 2 such that the energy of the output laser beams 12 in both cases may be equally high. Thus, the FIGURE 2 embodiment is especially useful in applications wherein finer control of the laser action is desired.

It is to be understood that the relatively low Q cavity formed between the two surfaces of the laser disk in FIGURE 2 may be employed as a laser oscillator without the need for an external reflector 9. This simplified form of laser oscillator has limitations in that it cannot be provided with any means for controlling the mode of laser action and thus finds use only in specific applications.

Figure 3:
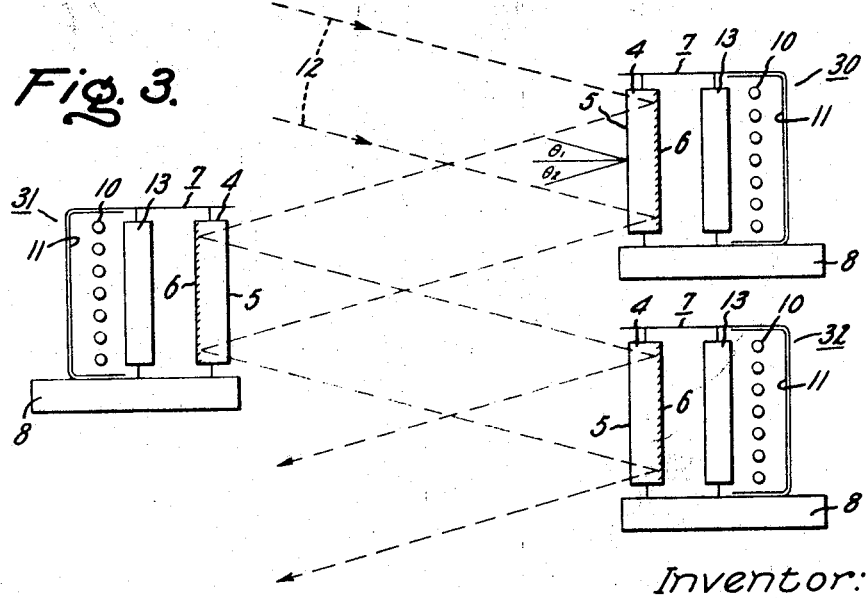
FIGURE 3 is a diagrammatic view of a serial arrangement of laser modules forming a high energy laser power amplifier.

Many applications require laser energy outputs which are higher than that obtained from a laser oscillator alone and for such cases a laser power amplifier is optically coupled to the output of the oscillator. The laser amplifier in accordance with my invention, as illustrated in FIGURE 3, is similar in construction to the laser oscillator in that a body of laser material is optically pumped, the primary distinction being that in the amplifier an unamplified laser beam generated by a laser oscillator is incident upon end surface 5 of the laser disk, and upon a double pass through the laser material (i.e. reflection from totally reflective surface 6) an amplified laser beam is emitted through surface 5. Since the amplifier is of the nonresonant type, surface 5 is either uncoated, or preferably is antireflection coated. The large area of the end surfaces provided by the disk-shaped laser, in addition to providing an efficient pumping geometry, permits the generation of a high output of laser energy while maintaining the energy density within the laser material below the destructive level. The combination of a laser disk 4, optical pumping lamps 10 (and power supply therefor), selective radiation filter 13 and housing 7 forms what may be defined as a laser module. Laser modules can be combined into multi-stage systems such as high energy laser oscillators and power amplifiers. In FIGURE 3, there is shown a plurality of serially optically coupled laser modules in a high energy laser power amplifier configuration. Each stage or laser module, designated as a whole by numerals 30, 31 and 32 includes an active-mirror-laser disk (the coatings on surfaces 5, 6 not being shown for purposes of simplification). Modules 30, 31 and 32 are positioned such that an unamplified laser beam 12, which may be the output of a laser oscillator (of the disk-type or conventional rod-type) is incident upon the surface 5 of the laser disk in module 30 at some acute angle $\theta_1$ from the normal axis thereof, undergoes a two-pass passage through the laser material upon reflection from surface 6, exits from the laser disk at the conjugate angle $\theta_2$, and in a similar manner undergoes two-pass passage in modules 31 and 32. The angles need not be the same for each module. The incident and exit angles are preferably maintained sufficiently small to permit a reasonably close orientation of the various modules which comprise the total power amplifier system. The incident and exit angles are not limited in their magnitude and thus may be the Brewster angle for the particular laser material to thereby reduce the air-dielectric interface reflection losses to zero.

The divergence of the amplified laser beam may be controlled by using suitable optical mode selecting components in the lower energy density portions of the laser system, and thus may be inserted in the oscillator and even in the first one or several stages of power amplification. The divergence may be further reduced by having the laser beam completely filling the end surface of the laser disk in each of the amplifier modules whereby a beam divergence in the order of seconds of arc can be attained. The efficiency of the power amplifier may be improved by several means. Thus, to fully extract the energy stored in the laser disks, the disk amplifiers should be driven to saturation. This can be accomplished by increasing the number of modules in series whereby the final modules are driven to saturation or by providing an optical regenerative feedback system which is isolated from the oscillator.

In FIGURE 4 there is shown a third, and preferred embodiment of the active mirror laser disk oscillator. This embodiment is similar to that of FIGURE 2 in that it provides a means for inserting optical mode selecting components in a lower laser energy density region of the optical resonant cavity. It differs from FIGURE 2, however, in that the FIGURE 2 (and 1) embodiment is of the on-axis type wherein the two defining ends of the optical resonant cavity are in both optical and physical alignment (i.e., coaxial), whereas the FIGURE 4 embodiment is of the off-axis type wherein the two ends are merely in optical alignment but not in physical alignment (i.e., not coaxial). In particular, laser disk 4, having the particular reflective coatings 15, 20 defined with respect to FIGURE 2, is positioned within an optical resonant cavity defined by a totally reflective plane mirror 33, and a partially transmissive plane mirror 9. The normal axes of mirrors 9 and 33 are at conjugate angles $\theta_1$, $\theta_2$ with respect to the normal axis of laser disk 4, similar to the orientation of the laser disks in FIGURE 3. Since mirror 9 is the output end of the cavity, the laser energy density in the disk 4-mirror 9 region is higher than in the disk 4-mirror 33 region and thus this (disk 4-mirror 33) region of the optical resonant cavity is especially adapted for insertion of a suitable optical control device 34 such as a mode selector or modulator. The FIGURE 2 embodiment may be described as the special case of the FIGURE 4 embodiment wherein the angles $\theta_1$, $\theta_2$ are equal to zero. It should be understood that the passive mirror 33 may also be an active mirror, thereby providing output laser beams with even higher energy.

A typical example of an active mirror laser disk apparatus consists of the following elements. Disk 4 is a neodymium activated laser glass of circular cross section measuring 6 inches in diameter by 1 inch in thickness. The 100% reflectivity (at the 1.06$\mu$ wavelength for neodymium) coated end surface 6 of the disk is optically pumped by a bank of six 6½" long by 15 mm. diameter, 10,000 joule xenon flash lamps which are spaced 1½ inches from the coated disk surface 6. The filter assembly 13 is comprised of a plate of ultarviolet absorbing glass enclosing a one cm. thickness of water and transmits only the useful pump radiation between 4,000 and 10,000 A. wavelength. This particular apparatus may be employed in a laser oscillator or laser power amplifier device.

From the foregoing description, it is apparent that my invention attains the objectives set forth and makes available an active mirror laser disk apparatus wherein one end surface of the laser disk is coated to provide total reflectivity at the laser energy wavelength and yet is highly transmissive at the optical pumping radiation wavelength. The active mirror disk may be employed in a laser oscillator or laser power amplifier system and is especially well adapted for high laser energy applications since a high energy laser beam may be produced over the large area of the disk end surfaces while maintaining the energy density below the level which may cause impairment or destruction of the laser material. Since the energy output of a laser device is directly proportional to the volume of laser material, and a disk-shaped laser having an end surface area of many square inches may readily be manufactured, it is apparent that a much greater volume of laser material may be optically pumped and thereby provide an extremely high level of laser energy in the form of a narrowly diverging beam of electromagnetic radiation. The laser disk is not volume limited as in the case of long rod-type laser. Since only one end surface of the disk need be unobscured for the entrance and exit of the laser beam, the other end surface is available for direct optical pumping which avoids the need for intricate pumping configurations, and obtains essentially uniform pump flux across the pumped disk end surface and high optical coupling efficiency. An additional advantage of the active mirror laser amplifier is that in making a double pass through the laser material, the input energy level required to achieve saturation of the laser disk is only ½ that required for a single pass (transmission) type amplifier. Finally, any reflection from the input (laser beam emitting end surface 5) of the disk is added to the output beam and thus there is no energy loss to a backward wave at the input as in the case of single-pass (transmission) type lasers wherein such power reflected at the input is lost. Thus, my invention eliminates the input impedance matching problems inherent in most lasers since any reflection at the input is not lost but is added to the output.

Having described three embodiments of an active mirror laser oscillator device and one embodiment of an active mirror power amplifier laser device, it is believed obvious that modification and variation of my invention is possible in the light of the above teachings. Thus, various shapes of the housing, laser disk and pumping lamps may readily be employed and the particular embodiment in the illustrations is not to be considered a limitation thereof. Further, cooling means for the lamps, controlled atmospheres, selective radiation filters (separate or integral with the lamp glass envelope) and separate reflector members for individual lamps may also be employed singly or in combination in the oscillator or amplifier embodiments. For continuous laser operation, cooling of both the disk and the lamps is necessary. The laser beam divergence can be further controlled by interposing optical mode selectors between adjacent laser modules. Finally, my invention is not limited to neodymium as the laser material but is intended to cover other solid laser materials in disk form such as the well known ruby, for example.

What I claim as new and desired to secure by Letters Patent of the United States is:

1. A laser apparatus comprising:
    a totally reflective plane mirror and a partially transmissive plane mirror in optical alignment with and spaced from said body of laser material, the normal axes of said totally reflective and partially transmissive mirrors being at conjugate angles with respect to the normal axis of said body of laser material whereby said totally reflective and patrially transmissive mirrors define an optical resonant cavity of a laser oscillator.

References Cited

UNITED STATES PATENTS

| 3,134,837 | 5/1964  | Kisliuk et al. | 331—94.5 |
| 3,177,446 | 4/1965  | Hoadley et al. | 331—94.5 |
| 3,243,722 | 3/1966  | Billings | 331—94.5 |
| 3,292,102 | 12/1966 | Byrne | 331—94.5 |
| 3,297,958 | 1/1967  | Weiner | 331—94.5 |
| 3,222,615 | 12/1965 | Holly | 331—94.5 |
| 3,215,949 | 11/1965 | Garrett | 331—94.5 |
| 3,414,835 | 12/1968 | Miller | 331—94.5 |
| 3,402,365 | 9/1968  | Uchida | 331—94.5 |
| 3,424,991 | 1/1968  | Martin | 331—94.5 X |

OTHER REFERENCES

Kisluk et al., Pulsed Ruby Maser as Light Amplifier, Proc. IRE, vol. 49, #11, November 1961, pp. 1635–1639.

JEWELL H. PEDERSEN, Primary Examiner

T. MAJOR, Assistant Examiner

PO-1050
(5/69)

UNITED STATES PATENT OFFICE
CERTIFICATE OF CORRECTION

Patent No. 3,466,569         Dated Sept. 9, 1969

Inventor(s) Chernoch, Joseph P.

It is certified that error appears in the above-identified patent and that said Letters Patent are hereby corrected as shown below:

Column 8, line 22, cancel beginning with
"1. A laser apparatus" to and including "laser oscillator."
in column 8, line 31, and insert the following claim:

--1. A laser apparatus comprising
a relatively short cylindrical body of laser material having a pair of opposed relatively large end surfaces wherein the diameter dimension exceeds the longitudinal dimension, a first of said pair of end surfaces having a reflectivity of substantially 100% at a laser radiation wavelength characteristic of the laser material and being highly transmissive at optical pumping radiation wavelengths which excite the laser material into a metastable high energy level,
means for optically pumping the body of laser material through said first end surface into the metastable high energy level whereby said body of laser material may subsequently emit a beam of laser radiation through a second of said pair of end surfaces, and
a totally reflective plane mirror and a partially transmissive plane mirror in optical alignment with and spaced from said body of laser material, the normal axes of said totally reflective and partially transmissive mirrors being at conjugate angles with respect to the normal axis of said body of laser material whereby said totally reflective and partially transmissive mirrors define an optical resonant cavity of a laser oscillator. --

SIGNED AND
SEALED
MAY 26 1970

(SEAL)
Attest:

Edward M. Fletcher, Jr.
Attesting Officer

WILLIAM E. SCHUYLER, JR.
Commissioner of Patents